United States Patent [19]

Roberts et al.

[11] 3,884,972

[45] May 20, 1975

[54] TRIS (2-CHLOROETHYL)PHOSPHORAMIDE— A CROSSLINKING AGENT FOR CELLULOSIC COMPOSITIONS

[75] Inventors: Earl J. Roberts, New Orleans; Mary Ann F. Brannan, Metairie; Stanley P. Rowland, New Orleans, all of La.

[73] Assignee: The United States of America as represented by the Secretary of Agriculture, Washington, D.C.

[22] Filed: June 24, 1970

[21] Appl. No.: 49,551

[52] U.S. Cl. .................... 260/551 P; 8/194; 8/116 P

[51] Int. Cl. .................... C07f 9/22

[58] Field of Search .................... 260/551

[56] References Cited

UNITED STATES PATENTS 2,784,116 3/1957 Lakatos et al. .................... 117/144

FOREIGN PATENTS OR APPLICATIONS 1,046,621 12/1958 Germany .................... 260/551

OTHER PUBLICATIONS

Bestian, Liebigs Annalen der Chemie, Vol. 566, pg. 210–44 (1950).

*Primary Examiner*—Harry I. Moatz

[57] ABSTRACT

Tris(2-chloroethyl)phosphoramide was prepared from ethylenimine and phosphorus oxychloride and reacted with cotton cellulose in the form of fabric by a pad-dry-cure process in the presence of a basic salt, such as sodium carbonate. Reagent incorporation levels up to 6 percent by weight were achieved. Cotton fabrics modified with tris(2-chloroethyl)phosphoramide were found to have enhanced wrinkle recovery properties.

1 Claim, No Drawings

TRIS (2-CHLOROETHYL)PHOSPHORAMIDE— A CROSSLINKING AGENT FOR CELLULOSIC COMPOSITIONS

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of a polyfunctional phosphoramide compound and to the reaction of said compound with cotton cellulose. Specifically, this invention relates to the preparation of tris(2-chloroethyl)phosphoramide (CPA) from the reaction of ethyleneimine with phosphorus oxychloride. More specifically, this invention relates to the preparation of this phosphoramide as a reagent useful in imparting a suitable degree of wrinkle resistance to cotton fabrics. The reaction with cotton fabrics is carried out in a water/dioxane solution utilizing common pad-dry-cure technique. Water-washing does not remove the reacted material from the treated cotton textiles.

The main object of this invention is to prepare the tris(2-chloroethyl)phosphoramide by a relatively inexpensive procedure.

Another object of the instant invention is to provide a reagent for enhancing the wrinkle resistance of cotton fabrics.

A further object of the invention is to provide a new tri-functional reagent for crosslinking cellulosic material.

A thorough literature search yielded no known method of preparation of the tris(2-chloroethyl)phosphoramide (CPA), and the compound also was not listed in any of the available literature.

It was desirable to react ethyleneimine with phosphorus-oxychloride in a low boiling solvent which could be readily removed from the reaction products. The temperature most suitable for the preparation of the CPA was controlled at about from −10° to −20°.

The equation applicable to this preparation would be:

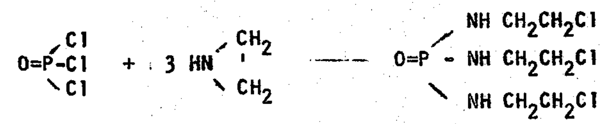

The product obtained from this reaction is a very viscous fluid not previously described in the literature. It could not be purified by distillation, due to decomposition, nor could it be made to crystallize. The crude CPA was estimated to be approximately 90 to 95 percent pure. This pure CPA is soluble in water but insoluble in moderately dilute aqueous solutions of inorganic bases and salts, and it is easily hydrolyzed by strong bases.

In order to prepare a suitable solution of the CPA to investigate the reaction of this compound with cellulose in the form of cotton fabric it was necessary to find a solvent mixture. A suitable solvent mixture found was the water/dioxane solutions in ratios of about from 1:1 to 3:1, respectively. To be able to incorporate the acid acceptor, which in most instances was sodium carbonate, it was necessary to find this ratio of solvents otherwise complete dissolution of both components would not occur.

BACKGROUND

Rowland and Roberts have reported their studies in the several instances in 1969 which appeared in Textile Research Journal. The characterization of the structure of cellulose modified with tris(1-azirdinyl)phosphine oxide (APO) was reported. The actual degree of substitution (DS) resulting from the reaction of azirdinyl units with cellulosic hydroxyl groups in this type of modified cotton was surprisingly low (e.g., cal. 0.01 at about 10–15 percent APO content). The major structural components which were identified in APO-modified cotton cellulose resulted from reaction of the aziridinyl units with water, yielding hydroxyethylamido units, and with each other, yielding polyethyleneimine units. Unopened azirdinyl rings were also detected.

Because tris(2-chloroethyl)phosphoramide appeared to offer the possibility of reacting with cotton cellulose to develop a higher proportion of ether linkages between the reagent residues and cellulose than already observed in the case of APO-modified cotton cellulose it was felt of interest to explore the performance properties and the structural details of cotton fabric modified with CPA. This investigative work was carried out and the comparative evaluation against the corresponding cotton fabric modified with APO is related to the present invention, and more fully presented in "An Exploratory Characterization of Cotton Cellulose Modified with Tris(2-chloroethyl)phosphoramide," a paper which appears in Textile Research Journal (to be published in 1970).

EXAMPLE 1

Preparation of tris(2-chloroethyl)phosphoramide (CPA)

Phosphorus oxychloride, 30.6 g (0.20 mole), was dissolved in 100 ml of ether and cooled to −20°C. Ethyleneimine, 28.6 g (0.66 mole), was dissolved in 100 ml of ether and slowly added from a dropping funnel to the stirred phosphorus oxychloride solution over a period of about 6 hrs. The temperature of the reaction mixture was maintained at −20°C during the entire addition. The solution was then allowed to come to room temperature and to stand for 16 hr. The ether was removed under vacuum, yielding 55 g (97.5 percent apparent yield) of viscous liquid. Attempts to distill the product resulted in its decomposition. The product was subjected to a vacuum of 5 microns for 24 hrs at 25°C in an attempt to remove the ether completely.

Analyses calculated percent for $C_6H_{15}OPN_3Cl_3$: C, 25.60; H, 5.38; N, 14.94; P, 11.03; Cl 37.36. Found: C, 26.63; H, 5.72; N, 15.20; P, 10.56; Cl, 36.15.

The Reaction of CPA with Cotton Cellulose

It was found that the reagent and the base could be dissolved in an aqueous solution of dioxane. A preferred combination of solvents for the reagent and base catalysts was a 25 percent solution of dioxane in water. Reaction with cotton fabric and CPA did not occur in this solvent mixture with base catalysts at room temperature. However, by the use of this solvent mixture and a pad-dry-cure process, it was possible to obtain significant incorporations of reagent into the fabric.

The preparation and properties of four samples of CPA-modified cotton are summarized in Table I. The conditioned wrinkle recovery angles are moderately high.

TABLE 1

Preparation and Fabric Properties of CPA-Modified Cotton

| Sample No.[a] | Base | CPA Incorporated (%) | Fabric Properties WRA Cond. | (W+F) Wet | Tear Strength (g) |
|---|---|---|---|---|---|
| 1 | $Na_2CO_3$ | 3.14 | 212 | 208 | 907 |
| 2 | $K_2CO_3$ | 4.50 | 205 | 206 | 900 |
| 3 | $Na_2CO_3$ | 5.98 | — | — | — |
| 4 | Triton B | 4.63 | 233 | 245 | 660 |
| 5 | Untreated cotton | — | 195 | 180 | 980 |

[a]Single pad-dry-cure treatments were involved in the case of samples 1, 2, and 4. Sample number 3 was given 3 pad-dry-cure treatments. Sample number 5 is the unmodified cotton printcloth.

Analysis of CPA-modified cotton cellulose showed that, relative to the nitrogen, 58–80 percent of the phosphorus of the CPA was retained after reaction. The sample prepared with Triton B was the exception: only 22 percent of the phosphorus was retained in this case. The chlorine retained (unreacted) in the modified fabric ranged from 22 to 30 percent, indicating that, on the average, the CPA reacted with a functionality slightly higher than two.

The phosphorus retained in APO-modified cotton cellulose ranged from 60 to 90 percent when zinc fluoborate was the catalyst. However, when sodium hydroxide was used as the catalyst the loss of nitrogen was greater than that of phosphorus. The phosphorus retained in APO-modified cotton prepared without a catalyst was not significantly different from that prepared with zinc fluoborate. Thus, CPA and APO are generally similar in loss of phosphorus during reaction with cotton cellulose.

The cotton fabrics reacted with the CPA were submitted to the ASTM Method D1295-67 for the wrinkle recovery test, to the ASTM Method D1424-63 for the Tearing Strength Test, and to nitrogen, phosphorus, and chlorine analysis. Also certain subjective tests were performed to more completely evaluate the treated samples.

In general, the preparation of CPA comprises:

a. preparing an ethylineimine solution in a suitable solvent, b. cooling the solution to about −20°C, c. preparing a phosphorusoxychloride solution, d. adding the solution of (c) dropwise to the solution of (b) while it is being stirred, making the addition slow enough to avoid "boil over" due to rise in temperature until all of (c) is added, continuing stirring until the mixture comes to room temperature, and e. distilling the solvent from the reaction product at temperatures not to exceed about 60°C, under reduced pressure (about 1 mm).

The following example is provided to illustrate the preparation of CPA-modified cotton derivatives. This should not be construed as limiting the invention in any manner whatever.

EXAMPLE 2

Cotton printcloth was desized, scoured, and bleached. The selected fabric was an 80 × 80 printcloth with a weight of about 3.5 ounces per square yard. Four samples were cut to a size of about 8 inches × 10 inches each, and each weight approximately 5.5 g. Various 25/75 dioxane in water solutions were prepared for use with the various formulations to be prepared later.

The general techniques employed with each of these samples consisted of submitting each fabric sample to impregnation by the 2 dip-2 nip method to a wet pickup of approximately 115 percent. Each was dried about 4 minutes at about 80°C, and cured 4 minutes at 140°C. (However, those skilled in this art would readily understand why drying time temperatures can be varied and how the curing temperatures can be about from 100° to 180°C, for example, and the curing times can be about for 1 to 10 minutes.) Each sample was water-washed at room temperature to remove all unreacted material, and allowed to air-dry at room temperature. Multiple treatments were done in the same manner.

Sample 1: The printcloth was treated in a solution containing 10.0 percent of CPA and 3.2 percent of sodium carbonate. The weight of CPA incorporated amounted to 3.14 percent of the modified fabric.

Sample 2: The fabric was treated in a solution containing 9.88 percent of CPA and 6.47 percent of potassium carbonate. The CPA incorporated was 4.50 percent.

Sample 3: The fabric was given three treatments in a solution containing 5.71 percent of CPA and 3.2 percent of sodium carbonate. The CPA incorporated was 5.98 percent.

Sample 4: The fabric was treated in a solution containing 10.0 percent of CPA and 49 percent of Triton B (40 percent aqueous solution of benzyltrimethylammonium hydroxide from a commercial laboratory). The CPA incorporated amounted to 4.63 percent.

We claim:

1. Tris(2-chloroethyl)phosphoramide.

* * * * *